(12) United States Patent
Xiong et al.

(10) Patent No.: US 11,114,711 B2
(45) Date of Patent: Sep. 7, 2021

(54) RAPID LOW-TEMPERATURE SELF-HEATING METHOD AND DEVICE FOR BATTERY

(71) Applicant: Beijing Institute of Technology, Beijing (CN)

(72) Inventors: Rui Xiong, Beijing (CN); Zeyu Chen, Beijing (CN); Hongwen He, Beijing (CN); Fengchun Sun, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 73 days.

(21) Appl. No.: 16/732,660

(22) Filed: Jan. 2, 2020

(65) Prior Publication Data

US 2020/0321668 A1    Oct. 8, 2020

(30) Foreign Application Priority Data

Apr. 8, 2019 (CN) .......................... 201910275815.3

(51) Int. Cl.
| | |
|---|---|
| *H01M 10/637* | (2014.01) |
| *H01M 10/615* | (2014.01) |
| *H01M 10/633* | (2014.01) |
| *H01M 10/48* | (2006.01) |
| *H05B 3/00* | (2006.01) |

(52) U.S. Cl.
CPC ....... *H01M 10/637* (2015.04); *H01M 10/486* (2013.01); *H01M 10/615* (2015.04); *H01M 10/633* (2015.04); *H05B 3/0004* (2013.01); *H05B 3/0014* (2013.01); *H05B 2203/035* (2013.01)

(58) Field of Classification Search
CPC ......... B60L 2240/545; B60L 2240/549; B60L 3/12; B60L 58/25; B60L 58/27; H01M 10/48; H01M 10/486; H01M 10/615; H01M 10/625; H01M 10/633; H01M 10/637; H01M 2010/4271; H01M 2220/20; H05B 1/0236; H05B 2203/035; H05B 3/0004; H05B 3/0014; Y02E 60/10; Y02T 10/70
See application file for complete search history.

(56) References Cited

U.S. PATENT DOCUMENTS

2018/0183115 A1*  6/2018  Qiu ..................... H01M 10/633

* cited by examiner

*Primary Examiner* — Victoria H Lynch
(74) *Attorney, Agent, or Firm* — Bayramoglu Law Offices LLC

(57) ABSTRACT

The present invention relates to a rapid low-temperature self-heating method and device for a battery. Active controllable large-current lossless short-circuit self-heating cooperates with an external heater to implement rapid composite heating, so that a battery is rapidly heated in a low-temperature environment and is controlled to fall within an optimal working temperature interval, so as to improve energy utilization of the battery and durability of a battery system. Before the battery system is started, battery temperature is first determined; when the temperature is less than a threshold, an external short-circuit is first proactively triggered to generate a large current to implement self-heating inside the battery. The method is simple, easy to implement, and safe and reliable, and can effectively resolve a problem that an electric vehicle has large capacity degradation and poor working performance in a low-temperature severe cold working condition.

17 Claims, 8 Drawing Sheets

RAPID LOW-TEMPERATURE SELF-HEATING METHOD AND DEVICE FOR BATTERY

TECHNICAL FIELD

The present invention relates to the field of heat management technologies for batteries used in electric vehicles, and in particular, to a low-temperature self-heating technology for batteries.

BACKGROUND

A battery has poor low-temperature performance. As impedance of the battery at low temperature greatly increases, a power capability of the battery significantly decreases. In addition, low-temperature charging easily triggers lithium precipitation to form dendritic crystals and cause a short circuit, thereby causing thermal runaway and other serious hazardous safety accidents. The low-temperature application performance has become a restraining factor that hinders popularization of electric vehicles in all climate and working conditions. Therefore, establishing a rapid heating method and device for batteries in a low temperature environment is of vital importance to improve the application performance of battery systems and electric vehicles in full climate and full working condition environment.

However, in an existing heating method, for example, short-circuit heating disclosed in a patent document CN101931111B, a condition for stopping heating is one of the following: a state of charge (SOC, state of charge) of a battery is not less than an SOC specified value, and a discharge current of the battery reaches a rated current of the battery or a heating time reaches a first maximum heating time; and the SOC of the battery is less than the SOC specified value, and the discharge current of the battery remains unchanged for specified duration or the discharge current decreases, or the heating time reaches a second maximum heating time. In this method, the current of the battery is restricted to below the rated current of the battery. In this case, large-current heating cannot be implemented, a battery temperature rise and a heating effect are limited, and rapid heating cannot be implemented. In addition, the battery brings a safety risk.

Triggering an external short-circuit can lead to a rapid temperature rise of a battery, but the external short-circuit damages the battery performance and affects the service life and safety of the battery. In the patent document CN101931111B, a safety problem in short-circuit heating of the battery and the impact on battery durability are not fully considered. In the present invention, an initially set lossless short-circuit time threshold is dynamically adjusted according to a battery state before a short circuit; and when a second current peak appears, a lossless short-circuit time threshold is dynamically corrected according to a time at which the second current peak appears, so as to implement rapid large-current short-circuit heating of a battery, and this cooperates with external heating, avoiding the impact of heating on the service life and safety of the battery during heating.

SUMMARY

The present invention provides a new combined-type rapid self-heating method and device formed based on a controllable lossless short-circuit heating mode and an external heating mode. Lossless short-circuit heating is based on an accurate controllable short-time short-circuit heating mode, and uses a combination of an offline manner and an online manner, that is, a lossless time threshold of an external short-circuit of a battery is constructed according to a critical time and a second current peak of the short-circuit, ensuring that a short-circuit heating time is dynamically adjusted during heating of the external short-circuit, so that the service life and safety of the battery are not affected; a battery temperature rise is estimated based on a heat production model and used as a basis of cooperation with an external heater. Further, the external heater is used as a necessary supplement of the lossless short-circuit heating mode, a heating control logic is established according to a difference value between target temperature and expected heating temperature of the external short-circuit; and the external heating method is implemented when an expected temperature rise of the lossless short-circuit is less than the target temperature.

A rapid low-temperature self-heating method for a battery is provided in the present invention, where a control method of a heating system specifically includes the following steps:

triggering a large-current external short-circuit for rapid heating of a battery, recording short-circuit duration and a short-circuit current when the external short-circuit occurs on the battery, and if the short-circuit duration satisfies any one of the following three conditions, terminating the external short-circuit:

condition 1: the short-circuit duration reaches an initially set lossless short-circuit time threshold, where the initially set lossless short-circuit time threshold is associated with an initial battery state of charge (SOC);

condition 2: a second current peak appears, and the short-circuit duration reaches a corrected lossless short-circuit time threshold, where the corrected lossless short-circuit time threshold is obtained by correcting the initially set lossless short-circuit time threshold on line by using a time at which the second short-circuit current peak of the battery appears; and condition 3: battery temperature is higher than target temperature; and estimating a predicted temperature rise when the external short-circuit occurs on the battery, and if a sum of initial temperature and the predicted temperature rise is higher than the target temperature, ending the heating, and starting the battery system; or if a sum of initial temperature and the predicted temperature rise is lower than target temperature, conducting external heating by using the external short-circuit of the battery and an external heater together, and after the battery temperature is higher than or equal to the target temperature, ending heating, and starting the battery system.

Still further, the corrected lossless short-circuit time threshold is a mean value of the time at which the second current peak appears and the initially set lossless short-circuit time threshold.

Still further, a method for determining the initially set lossless short-circuit time threshold includes: in a laboratory environment, conducting external short-circuit test on the battery, gradually increasing short-circuit duration, repeating multiple times of short circuits in any short-circuit duration, testing battery capacities before and after the short circuits, and using maximum short-circuit duration in which there is no obvious change in battery capacities before and after short circuits as a critical short-circuit time threshold, where a battery capacity change whose percentage is lower than a specific threshold is determined as no obvious change; and recording critical short-circuit time thresholds in different SOCs, and shifting downward to a safe area by using the critical short-circuit time thresholds as a base, so as to obtain the initially set lossless short-circuit time threshold.

Still further, the external short-circuit test on the battery is conducted in different environment temperature and aging states.

Still further, a condition for triggering the large-current external short-circuit for rapid heating of the battery is that the battery temperature is less than a critical temperature threshold and rapid heating is required.

Still further, the rapid low-temperature self-heating device includes a low-temperature heating control unit, a short-circuit trigger device, a main control switch K1, an external heating control switch K2, and an external heater.

Still further, the low-temperature heating control unit is connected to a control end of the short-circuit trigger device, and the low-temperature heating control unit controls the main control switch K1 and the external heating control switch K2; and the main control switch K1 is connected between a positive electrode of the battery and a DC/DC converter.

Still further, the external heater is arranged on the surface of the battery, one end of the external heater is connected to the positive electrode of the battery, and the other end thereof is connected to the external heating control switch K2.

Still further, one end of the external heating control switch K2 is connected to a negative electrode of the battery, and the other end thereof is connected to the external heater.

Still further, two ends of the short-circuit trigger device are respectively connected to the positive electrode and the negative electrode of the battery, and is in parallel with the external heater.

Still further, the low-temperature heating device further includes a Hall sensor H1 and a Hall sensor H2, where the Hall sensor H1 is configured to acquire a short-circuit current of the battery, predict heat produced due to a short circuit and a battery temperature rise according to the short-circuit current, and monitor whether a second short-circuit current peak appears; and the Hall sensor H2 is configured to monitor an output current of the battery system.

Still further, the short-circuit trigger device is used to implement trigger and termination of an external short-circuit of the battery; the short-circuit trigger device is a controllable switch with low contact internal resistance; and the low-temperature heating control unit controls switch-on or switch-off of the short-circuit trigger device through remote control.

Still further, both the main control switch K1 and the external heating control switch K2 are in an off state, and the short-circuit trigger device is controlled to trigger an external short-circuit of the battery.

Still further, the external heating control switch K2 is switched on, and external self-heating is conducted by using the external heater.

Still further, after the heating ends, the main control switch K1 is switched on to start the battery system.

DETAILED DESCRIPTION

The present invention provides a combined-type low-temperature self-heating device and method for a battery based on a combination of controllable lossless short-time external short-circuit self-heating and external heating. Content of the present invention is further described in detail with reference to accompanying diagrams.

The battery is preferably a lithium ion battery.

Figure 1:
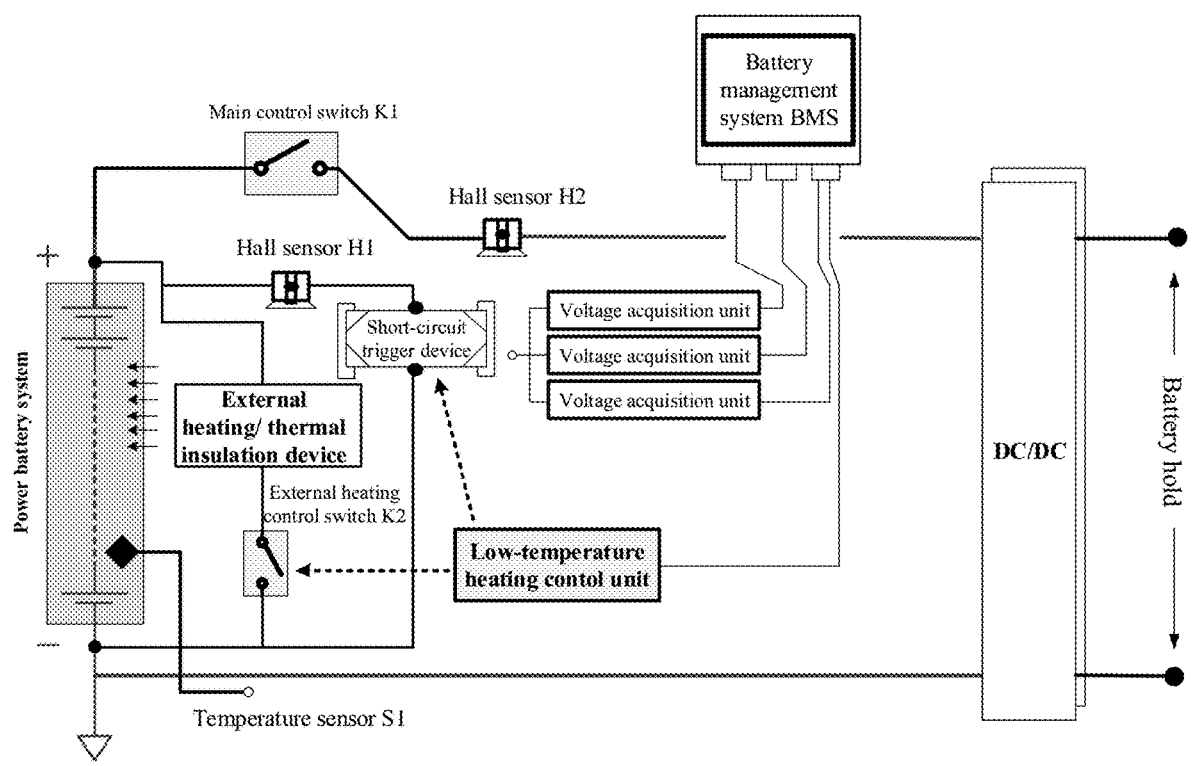
FIG. 1 is a structural diagram of a combined-type low-temperature heating device for a battery.

A low-temperature heating device for a battery is shown in FIG. 1. The device includes a low-temperature heating control unit, a short-circuit trigger device, a battery management system, a voltage acquisition unit, a current acquisition unit, a temperature acquisition unit, a Hall sensor H1, a Hall sensor H2, a main control switch K1, an external heating control switch K2, and an external heater.

The low-temperature heating control unit is connected to a control end of the short-circuit trigger device, and the low-temperature heating control unit controls the main control switch K1 and the external heating control switch K2; and the main control switch K1 is connected between a positive electrode of the battery and a DC/DC converter after being connected in series to the Hall sensor H2.

The external heater is arranged on the surface of the battery, one end of the external heater is connected to the positive electrode of the battery, and the other end thereof is connected to the external heating control switch K2; one end of the external heating control switch K2 is connected to a negative electrode of the battery, and the other end thereof is connected to the external heater; two ends of the short-circuit trigger device are respectively connected to the positive electrode and the negative electrode of the battery, and is in parallel with the external heater; and a temperature sensor S1 is attached to the surface of the battery, and the battery management system is equipped with the voltage acquisition unit, the current acquisition unit, and the temperature acquisition unit, and is configured to monitor a battery status in real time. The low-temperature heating device further includes the Hall sensor H1 and the Hall sensor H2, where the Hall sensor H1 is configured to acquire a short-circuit current of the battery, predict heat produced due to a short circuit and a battery temperature rise according to the short-circuit current, and monitor whether a second current peak appears; and the Hall sensor H2 is configured to monitor an output current of the battery system.

In the present invention, the short-circuit trigger device is connected to the positive electrode and the negative electrode of the battery. The short-circuit trigger device is a controllable switch with low contact internal resistance, and may be an electromagnetic switch or a switch in another control form; the low-temperature heating control unit controls switch-on or switch-off of the short-circuit trigger device through remote control; and an external short-circuit of the battery is triggered when the short-circuit trigger device is switched on, and the external short-circuit of the battery is terminated when the short-circuit trigger device is switched off.

A short-circuit time is controlled by the low-temperature heating control unit. First, a critical short-circuit time threshold of the external short-circuit needs to be determined, and when short-circuit duration is less than the threshold, the battery is not damaged. A determining method is as follows: A method using a combination of an offline manner and an online manner is used, and specifically includes two steps:

(1) In a laboratory environment, first conduct external short-circuit test on the battery of the system, gradually increase short-circuit duration, repeat multiple times of short circuits in any short-circuit duration, test a battery capacity change before and after the short circuits, and use maximum short-circuit duration in which there is no obvious change in battery capacities before and after short circuits as a critical short-circuit time threshold; and record critical short-circuit time thresholds in different SOCs, and shift downward to a safe area by using the critical short-circuit time thresholds as a base, so as to form an initially set lossless short-circuit time threshold.

A battery capacity change whose percentage is lower than a specific threshold value is "no obvious change", and a degree of no obvious change is determined by a person skilled in the art according to a battery type, a model characteristic, and a battery safety requirement. In other words, the specific threshold is determined by a person skilled in the art according to the battery type, the model characteristic, and the battery safety requirement. Preferably, large-current short-circuit heating is repeated for 20 times, and the specific threshold is 5%.

Figure 3:
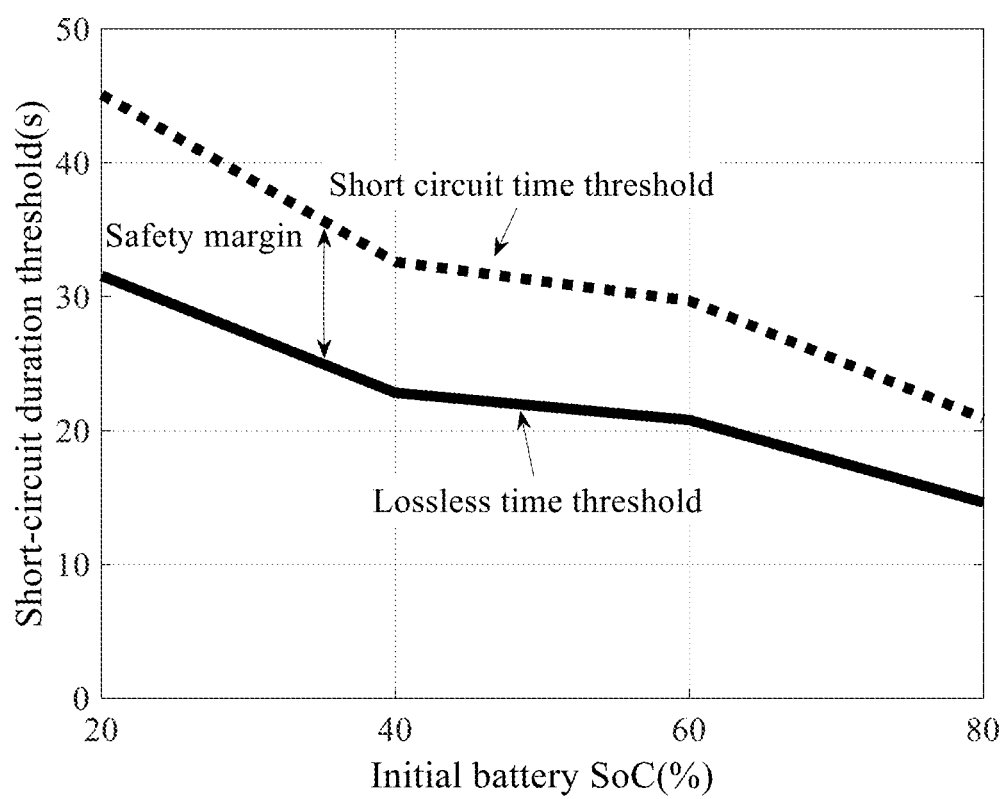
FIG. 3 shows a curve of initially set lossless short-circuit time thresholds.

The critical short-circuit time threshold is a value associated with an initial battery state of charge (SOC), and therefore the initially set lossless short-circuit time threshold is also a value associated with the initial battery state of charge (SOC). Preferably, FIG. 3 shows critical short-circuit time thresholds and initially set lossless short-circuit time thresholds in different initial battery SOCs. In different environment temperature and battery aging states, the foregoing process can be repeated to obtain more detailed lossless short-circuit time thresholds.

(2) Based on the initially set lossless short-circuit time threshold obtained in the last step, when the low-temperature heating device operates on line, the battery management system records a short-circuit current of the battery in real time; when a short circuit occurs on the battery, a large current is instantly generated, and the large current causes an increase in internal polarization resistance and the current decreases gradually, but a temperature rise in the battery leads to a decrease in Ohmic resistance, causing a second discharge peak of a current of the battery, that is, a second current peak appears; and if the external short-circuit further continues, electrolyte and a passive film may be decomposed, and therefore the initially set lossless short-circuit time threshold in the first step is corrected on line by using a time at which the second current peak appears, where a correction manner is preferably shown in FIG. 1:

$$t_s(SOC) = \frac{(t_{S\_INI}(SOC) + t_c)}{2} \quad (1)$$

$t_S$ is a corrected lossless short-circuit time threshold; $t_{S\_INI}$ is the initially set lossless short-circuit time threshold; $t_C$ is the time at which the second current peak appears; and SOC is an initial battery state of charge before a short circuit.

Because the initially set lossless short-circuit time threshold and the corrected lossless short-circuit time threshold are very transient, only heating implemented through the external short-circuit does not necessarily satisfy a heating temperature requirement. However, if the short-circuit duration continues to be extended, problems of battery safety and durability are caused. Therefore, an external heater and a lossless short-circuit cooperate with each other to form a combined-type heating method. According to duration of the lossless short-circuit, a large current generated by the short circuit produces Ohm heat for internal heating on the battery, and a heat production rate of the large current can be estimated according to the following formula:

$$\Delta T = \frac{1}{mC_p} \int_{t_0}^{t_s} I_E(U_E - U_{Batt})dt \quad (2)$$

m is a mass of the battery; Cp is a specific heat capacity of the battery; $I_E$ is a short-circuit current of the battery; $U_E$ is an open-circuit voltage of the battery; $U_{Batt}$ is a terminal voltage of the battery; $\Delta T$ is a predicted temperature rise; $T_0$ is initial temperature; and $T_L$ is target temperature.

If $T_0+\Delta T \geq T_L$, the external heater is not started, and after the lossless short-circuit is terminated, the battery system can be started after temperature rises to fall within an optimal temperature interval.

If $T_0+\Delta T < T_L$, the external heater is started and completes heating together with the lossless short-circuit, where the external heater may be made of a nickel-aluminum alloy material with high electrical resistivity and high thermal conductivity, fabricated into a mesh sheet shape, and arranged on the surface of a battery pack, or may use another heating mode. When the external heating control switch K2 is switched on, a current of the battery pack flows from a positive electrode of the battery pack to a negative electrode of the battery pack through the heater. Due to the high electrical resistivity of the heater, a current shunted to the heater produces heat, as shown in the following formula:

$$Q_Z = (I_{Batt} - I_D)^2 \rho \frac{L}{S} \quad (3)$$

$I_{Batt}$ is a current output by the battery pack; $I_D$ is a load current; ρ is electrical resistivity; L is a total length of a resistance wire of the heater; and S is a cross sectional area of the resistance wire.

Working of the combined-type low-temperature heating device specifically includes the following steps:

S1. Before the combined-type low-temperature heating device is started, the battery management system monitors battery temperature, and determines whether low-temperature heating is required; and if the battery temperature is greater than a low-temperature threshold $T_L$, the battery system is normally started; and if the battery temperature is less than a critical temperature threshold, proceed to step S2.

S2. Both the main control switch K1 and the external heating control switch K2 are in an off state, and the short-circuit trigger device is controlled to generate an external short-circuit of the battery.

S3. Record short-circuit duration and a short-circuit current, and if the short-circuit duration satisfies any one of the following three conditions, proceed to step S4:

Condition 1: the short-circuit duration reaches an initially set lossless short-circuit time threshold.

Condition 2: a second current peak appears, and the short-circuit duration reaches the forgoing corrected lossless short-circuit time threshold; and preferably, the short-circuit duration reaches a mean value of a time at which the second current peak appears and the initially set lossless short-circuit time threshold.

Condition 3: battery temperature is higher than target temperature.

S4. Control the short-circuit trigger device to be switched off to terminate the external short-circuit.

S5. Estimate a temperature rise of the battery in case of a lossless short-circuit according to a heat production model, and if a sum of initial temperature and a predicted temperature rise is higher than the target temperature, proceed to step S7, and end heating; otherwise, proceed to step S6.

S6. Switch on the external heating control switch K2, use the external heater to conduct external self-heating, record battery temperature, and when the battery temperature reaches the target temperature, proceed to S7.

S7. End heating, switch on the main control switch K1, and start the battery system.

The present invention is further described through the following specific implementation process of the heating method and device.

Figure 2:
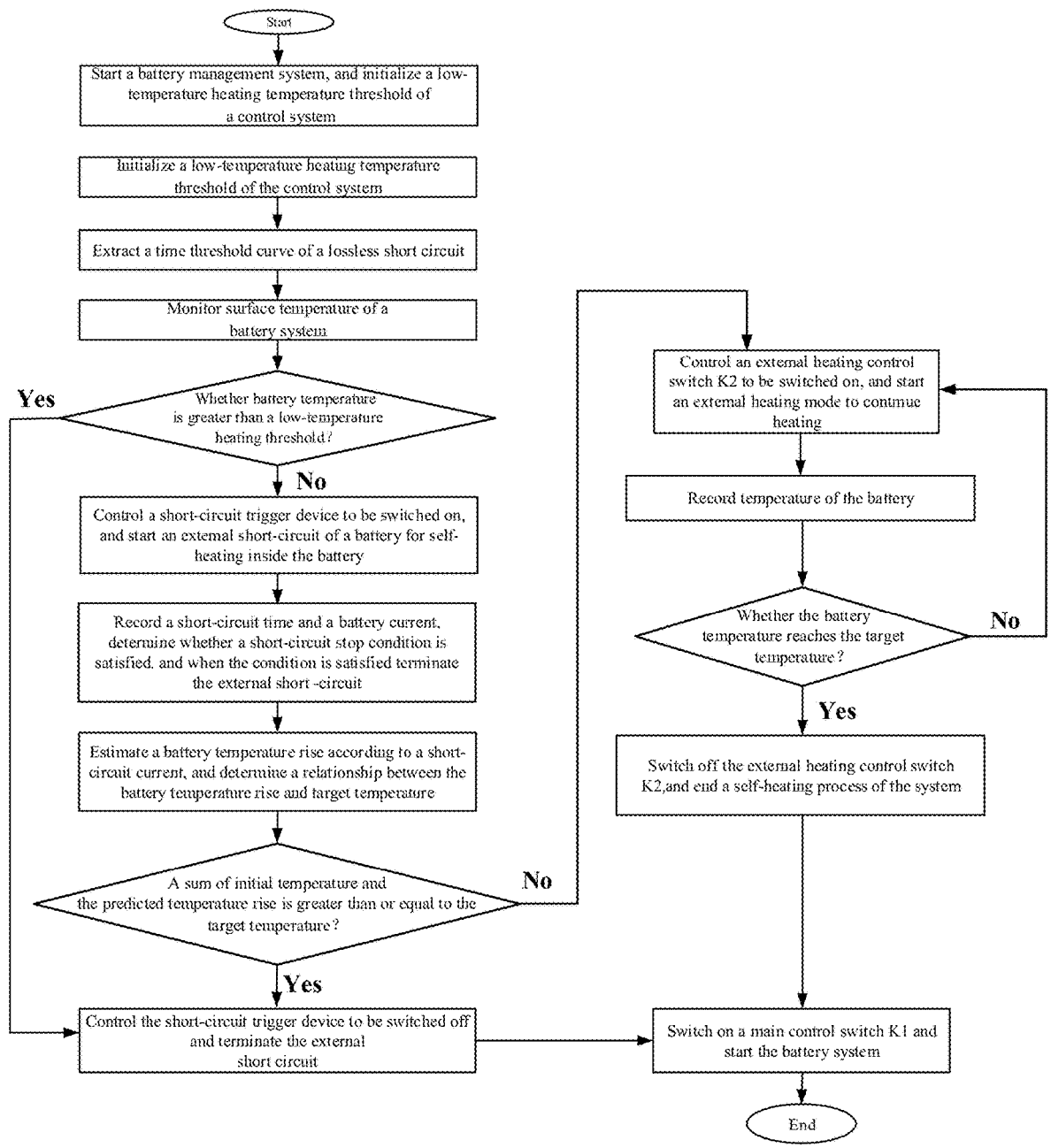
FIG. 2 is a flowchart of a combined-type low-temperature heating method.

In this embodiment, a 18650HZ NMC lithium-ion battery is used as an example. A nominal capacity of a battery pack is 2.5 Ah, environment temperature of the battery is within a range of −15° C. to −20° C. and an actually measured capacity in this temperature range is 0.48 Ah and is only 19% of the nominal capacity. Due to influence brought by a low-temperature environment, capacity degradation of the battery pack is very obvious. Therefore, low-temperature heating is required. The battery management system uses an MOTOHAWK controller as a processing unit; an electromagnetic relay is an SSR-25DA model; a temperature sensor is a patch K thermocouple; and a main control switch and a subcontrol switch are RA890F1478 electronic switches with a safety protection function. A specific process is shown in FIG. 2.

In this embodiment, low-temperature heating is conducted twice in total, and the implementation process is as follows:

Step 1. Conduct first-time low-temperature heating first, where an initial SOC of the battery is 50%; environment temperature of the battery is −20° C. (±1° C.); an initialized low-temperature threshold $T_L$ is 5° C.; and when the battery temperature is lower than this temperature, conduct rapid low-temperature heating.

Step 2. The BMS monitors environment temperature of the battery, determines whether low-temperature heating is required, and conducts a low-temperature heating operation process. Measured temperature is obviously lower than 5° C., and therefore the low-temperature heating control unit sends an instruction to start the low-temperature self-heating device of the battery.

Step 3. Define that a battery capacity change before and after twenty times of short-circuit heating is less than 5% is "no obvious change", determine a lossless short-circuit time threshold in a laboratory environment according to the steps in the specification. A result is shown in FIG. 3. In this embodiment, an initially set lossless short-circuit time threshold of the battery in a current SOC state is 20 seconds.

Step 4. Control the short-circuit trigger device to be switched on through the low-temperature heating control unit, start the low-temperature heating device, monitor a short-circuit current of the battery by using the Hall sensor H1, where a second current peak does not appear.

Step 5. Estimate, according to the formula 2, that a temperature rise of lossless short-circuit heating is approximately 30° C. Therefore, the external heater does not need to be started. After short-circuit duration reaches the initially set lossless short-circuit time threshold, the low-temperature heating control unit controls the short-circuit trigger device to be switched off, and heating ends.

Figure 4:
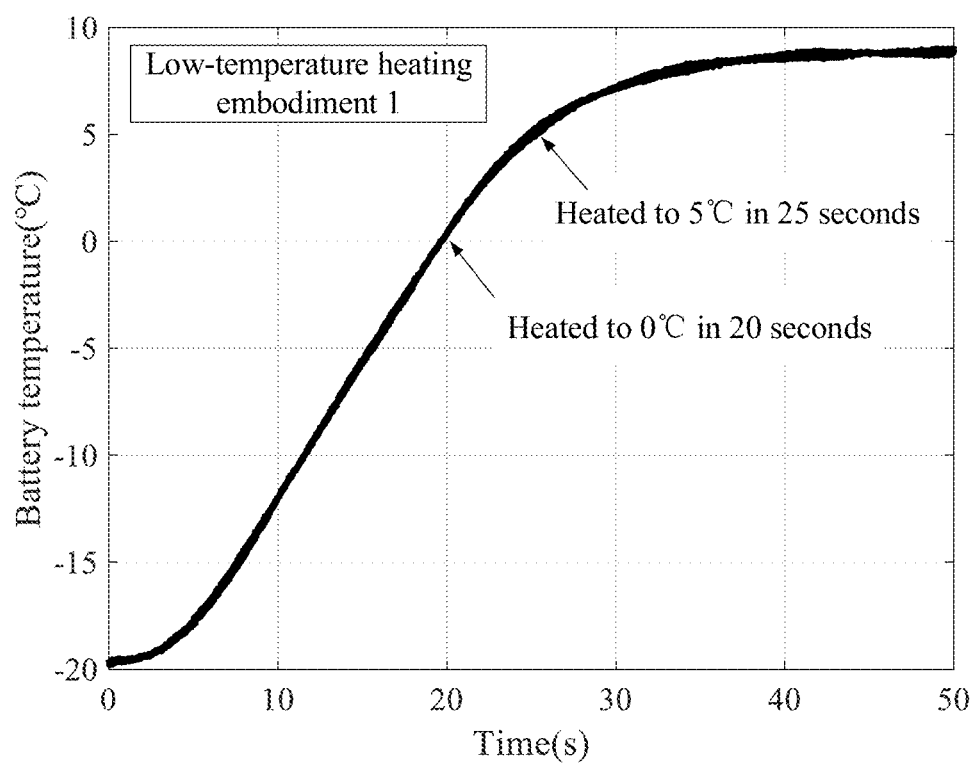
FIG. 4 shows a changing curve of battery temperature during first heating.
Figure 5:
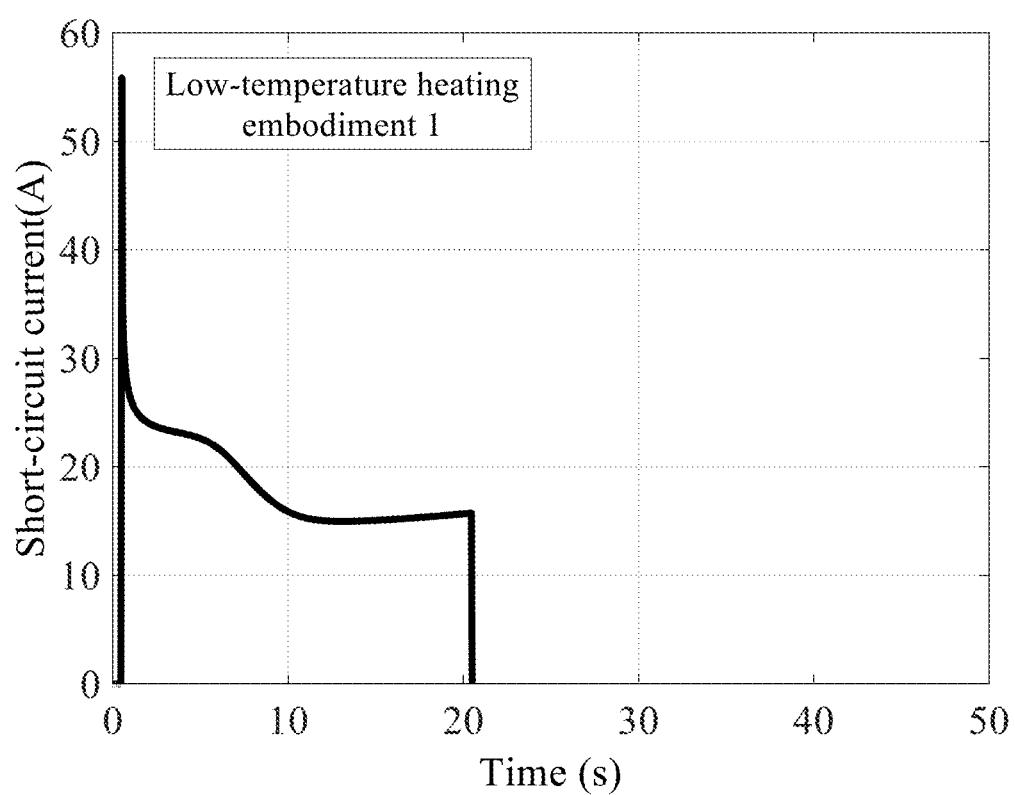
FIG. 5 shows a changing curve of a short-circuit current of a battery during first heating.

Step 6. Record battery temperature after heating. A changing curve of battery temperature during first heating is shown in FIG. 4, where temperature rises from −20° C. to 5° C. after 25 seconds. During first heating, duration of a short-circuit current is 20 seconds. A changing curve of a short-circuit current of the battery is shown in FIG. 5.

Step 7. Conduct second-time low-temperature heating; change the experiment condition to the following: the initial SOC of the battery is 20%, the environment temperature is 15° C. (±1° C.), the initialized low-temperature threshold $T_L$ 5° C.; and when the battery temperature is lower than this temperature, conduct rapid low-temperature heating.

Step 8. The BMS monitors environment temperature of the battery, determines whether low-temperature heating is required, and conducts a low-temperature heating operation process. Measured temperature is obviously lower than 5° C., and therefore the low-temperature heating control unit sends an instruction to start the low-temperature self-heating device of the battery.

Step 9. Extract a lossless short-circuit time threshold. An initially set lossless short-circuit time threshold of the battery in a current SOC state is 15 seconds.

Step 10. Control the short-circuit trigger device to be switched on through the low-temperature heating control unit, start the low-temperature heating device, and monitor a short-circuit current of the battery by using the Hall sensor H1, where a second current peak appears at a fifth second, and therefore the low-temperature heating threshold is corrected on line, and the threshold is corrected to 10 seconds according to the formula 1.

Figure 6:
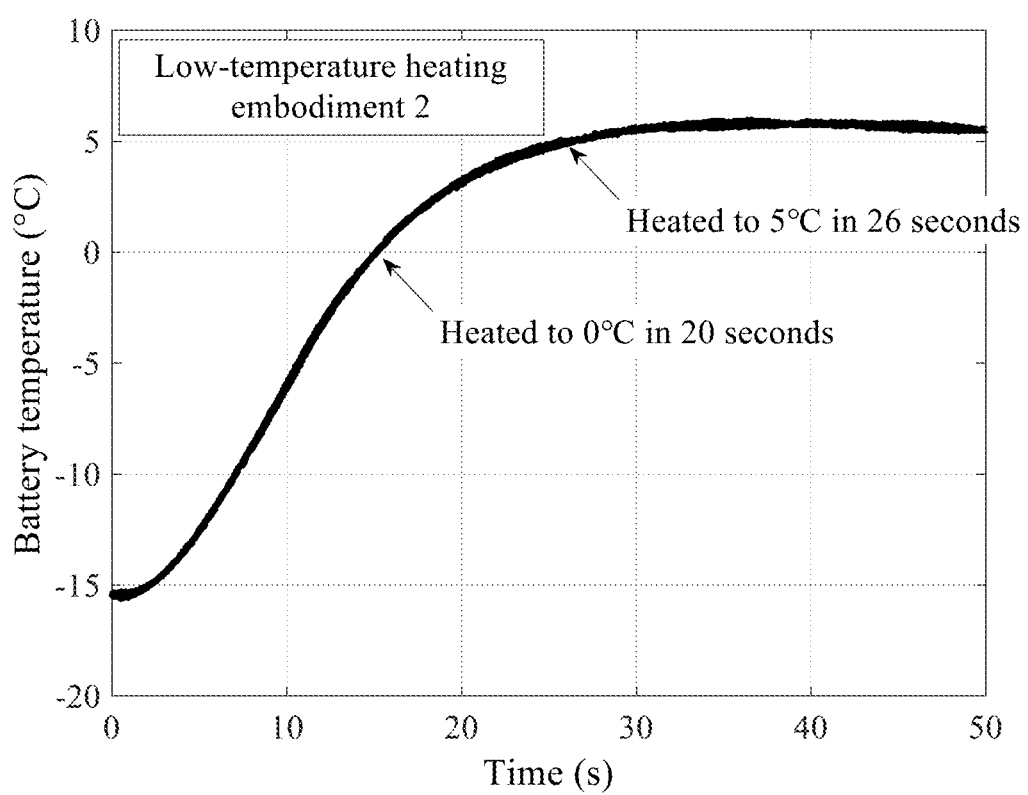
FIG. 6 shows a changing curve of battery temperature during second heating.
Figure 7:
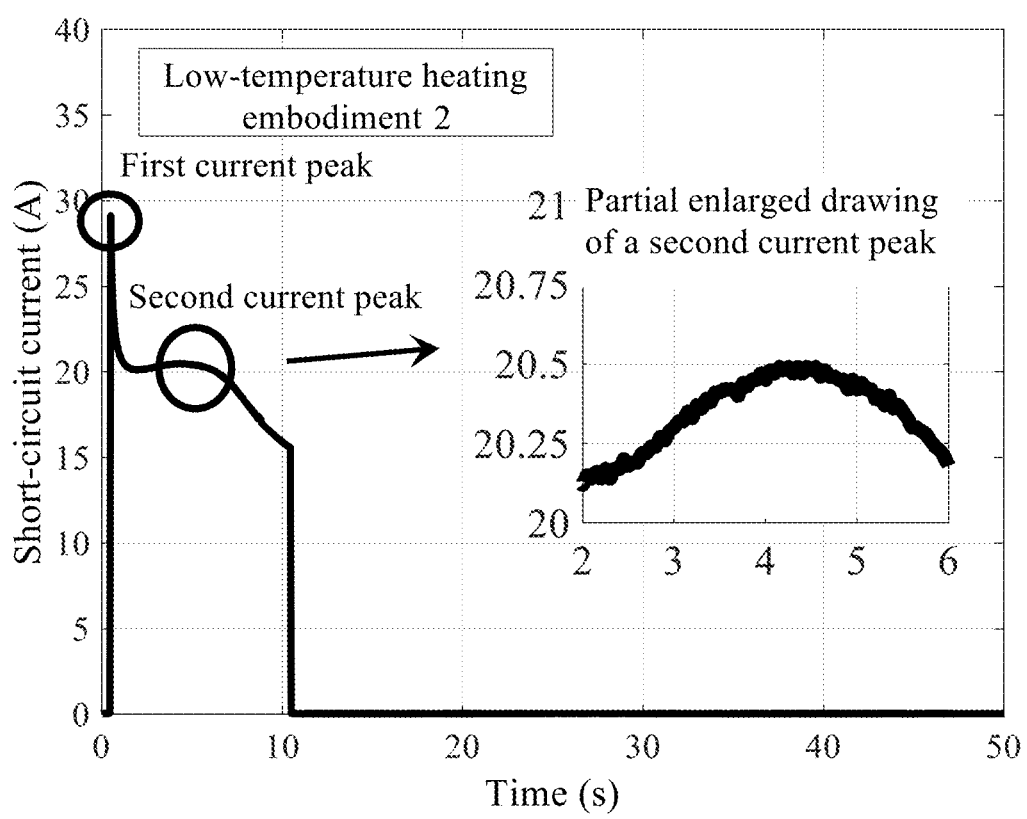
FIG. 7 shows a changing curve of a short-circuit current of a battery during second heating.

Step 11. Estimate, according to the formula 2, that a temperature rise of lossless short-circuit heating is approximately 15° C. Therefore, the external heater is started for joint heating, and after temperature exceeds 5° C., heating is ended. A changing curve of battery temperature during second-time heating is shown in FIG. 6, where temperature rises from −15° C. to 5° C. after 26 seconds during second-time heating. A changing curve of a short-circuit current of the battery during second-time heating is shown in FIG. 7.

Step 12. After heating is ended, normally start the battery system.

Figure 8:
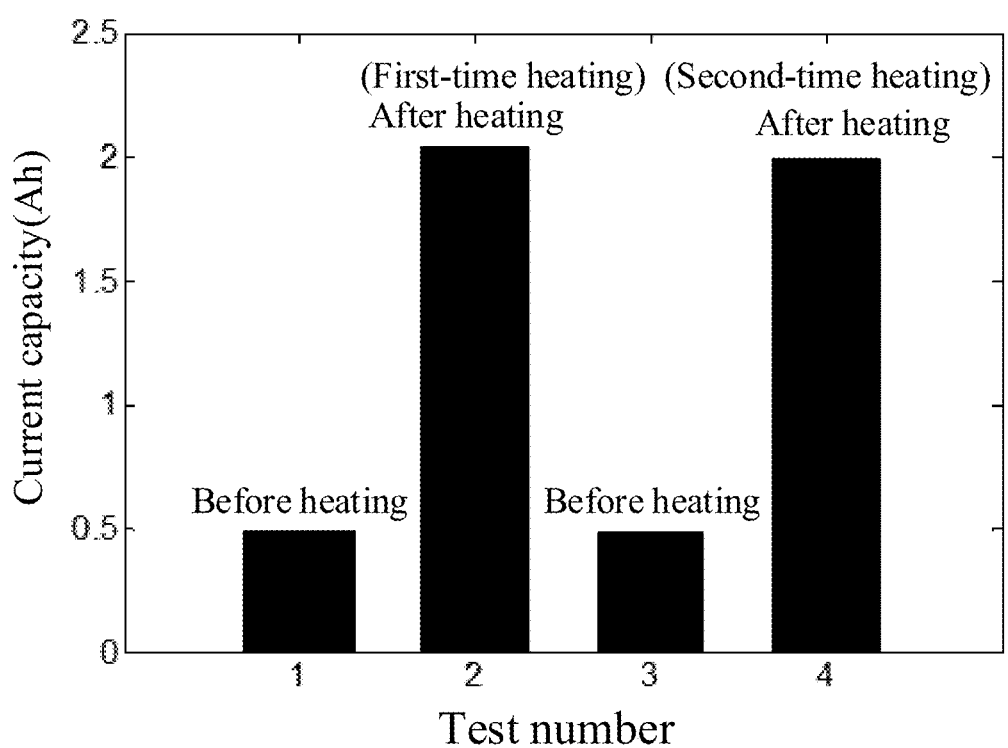
FIG. 8 shows a comparison result of capacity test before and after low-temperature heating.

Step 13. Conduct capacity test on the heated battery, where a result is shown in FIG. 8.

In this embodiment, through low-temperature heating, a battery capacity becomes approximately 1.5 Ah higher than that before heating. The temperature rises from −20° C. to 5° C. after 25 seconds during first-time heating, and the temperature rises from −15° C. to 5° C. after 26 seconds during second-time heating. In this way, an ideal heating effect and a high heating speed are achieved.

What is claimed is:

1. A rapid low-temperature self-heating method for a battery, wherein a control method of a heating system specifically comprises the following steps:
triggering a large-current external short-circuit for rapid heating of the battery, recording short-circuit duration and a short-circuit current when the external short-circuit occurs on the battery, and if the short-circuit duration satisfies any one of the following three conditions, terminating the external short-circuit:

condition 1: the short-circuit duration reaches an initially set lossless short-circuit time threshold, wherein the initially set lossless short-circuit time threshold is associated with an initial battery state of charge (SOC);

condition 2: a second current peak appears, and the short-circuit duration reaches a corrected lossless short-circuit time threshold, wherein the corrected lossless short-circuit time threshold is obtained by correcting the initially set lossless short-circuit time threshold on line by using a time at which a second short-circuit current peak of the battery appears; and condition 3: battery temperature is higher than target temperature; and estimating a predicted temperature rise when the external short-circuit occurs on the battery, and if a sum of initial temperature and the predicted temperature rise is higher than the target temperature, ending the heating, and starting a battery system; or if the sum of initial temperature and the predicted temperature rise is lower than the target temperature, conducting external heating by using the external short-circuit of the battery and an external heater together, and after the battery temperature is higher than or equal to the target temperature, ending heating, and starting the battery system, wherein the corrected lossless short-circuit time threshold is a mean value of the time at which the second current peak appears and the initially set lossless short-circuit time threshold.

2. The method according to claim 1, wherein a method for determining the initially set lossless short-circuit time threshold comprises: in a laboratory environment, conducting external short-circuit test on the battery, gradually increasing short-circuit duration, repeating multiple times of short circuits in any short-circuit duration, testing battery capacities before and after the short circuits, and using maximum short-circuit duration in which there is no obvious change in battery capacities before and after short circuits as a critical short-circuit time threshold, wherein a battery capacity change whose percentage is lower than a specific threshold value is determined as no obvious change; and recording critical short-circuit time thresholds in different SOCs, and shifting downward to a safe area by using the critical short-circuit time thresholds as a base, so as to obtain the initially set lossless short-circuit time threshold.

3. The method according to claim 2, wherein the external short-circuit test on the battery is conducted in different environment temperature and aging states.

4. A device for implementing the heating method according to claim 3, comprising a low-temperature heating control unit, a short-circuit trigger device, a main control switch K1, an external heating control switch K2, and the external heater, wherein the low-temperature heating control unit is connected to a control end of the short-circuit trigger device, and the low-temperature heating control unit controls the main control switch K1 and the external heating control switch K2; and the main control switch K1 is connected between a positive electrode of the battery and a DC/DC converter, the external heater is arranged on a surface of the battery, one end of the external heater is connected to the positive electrode of the battery, and an other end thereof is connected to the external heating control switch K2, one end of the external heating control switch K2 is connected to a negative electrode of the battery, and an other end thereof is connected to the external heater; and two ends of the short-circuit trigger device are respectively connected to the positive electrode and the negative electrode of the battery, and is in parallel with the external heater.

5. A device for implementing the heating method according to claim 2, comprising a low-temperature heating control unit, a short-circuit trigger device, a main control switch K1, an external heating control switch K2, and the external heater, wherein the low-temperature heating control unit is connected to a control end of the short-circuit trigger device, and the low-temperature heating control unit controls the main control switch K1 and the external heating control switch K2; and the main control switch K1 is connected between a positive electrode of the battery and a DC/DC converter, the external heater is arranged on a surface of the battery, one end of the external heater is connected to the positive electrode of the battery, and an other end thereof is connected to the external heating control switch K2;

one end of the external heating control switch K2 is connected to a negative electrode of the battery, and an other end thereof is connected to the external heater; and two ends of the short-circuit trigger device are respectively connected to the positive electrode and the negative electrode of the battery, and is in parallel with the external heater.

6. The method according to claim 1, wherein a condition for triggering the large-current external short-circuit for rapid heating of the battery is that the battery temperature is less than a critical temperature threshold and rapid heating is required.

7. A device for implementing the heating method according to claim 6, comprising a low-temperature heating control unit, a short-circuit trigger device, a main control switch K1, an external heating control switch K2, and the external heater, wherein the low-temperature heating control unit is connected to a control end of the short-circuit trigger device, and the low-temperature heating control unit controls the main control switch K1 and the external heating control switch K2; and the main control switch K1 is connected between a positive electrode of the battery and a DC/DC converter;

the external heater is arranged on a surface of the battery, one end of the external heater is connected to the positive electrode of the battery, and an other end thereof is connected to the external heating control switch K2; one end of the external heating control switch K2 is connected to a negative electrode of the battery, and an other end thereof is connected to the external heater; and two ends of the short-circuit trigger device are respectively connected to the positive electrode and the negative electrode of the battery, and is in parallel with the external heater.

8. A device for implementing the heating method according to claim 1, comprising a low-temperature heating control unit, a short-circuit trigger device, a main control switch K1, an external heating control switch K2, and the external heater, wherein the low-temperature heating control unit is connected to a control end of the short-circuit trigger device, and the low-temperature heating control unit controls the main control switch K1 and the external heating control switch K2; and the main control switch K1 is connected between a positive electrode of the battery and a DC/DC converter;

the external heater is arranged on a surface of the battery, one end of the external heater is connected to the positive electrode of the battery, and an other end thereof is connected to the external heating control switch K2;

one end of the external heating control switch K2 is connected to a negative electrode of the battery, and an other end thereof is connected to the external heater; and two ends of the short-circuit trigger device are respectively connected to the positive electrode and the negative electrode of the battery, and is in parallel with the external heater.

9. A device for implementing a rapid, low-temperature self-healing method for a battery, comprising a low-temperature heating control unit, a short-circuit trigger device, a main control switch K1, an external heating control switch K2, and an external heater, wherein the low-temperature heating control unit is connected to a control end of the short-circuit trigger device, and the low-temperature heating control unit controls the main control switch K1 and the external heating control switch K2; and the main control switch K1 is connected between a positive electrode of the battery and a DC/DC converter;

the external heater is arranged on a surface of the battery, one end of the external heater is connected to the positive electrode of the battery, and an other end thereof is connected to the external heating control switch K2;

one end of the external heating control swatch K2 is connected to a negative electrode of the battery, and an other end thereof is connected to the external heater; and two ends of the short-circuit trigger device are respectively connected to the positive electrode and the negative electrode of the battery, and is in parallel with the external heater;

wherein a control method of a heating system specifically comprises the following steps:

triggering a large-current external short-circuit for rapid heating of the battery, recording short-circuit duration and a short-circuit current when the external short-circuit occurs on the battery, and if the short-circuit duration satisfies any one of the following three conditions, terminating the external short-circuit:

condition 1: the short-circuit duration reaches an initially set lossless short-circuit time threshold, wherein the initially set lossless short-circuit time threshold is associated with an initial battery state of charge (SOC);

condition 2: a second current peak appears, and the short-circuit duration reaches a corrected lossless short-circuit time threshold, wherein the corrected lossless short-circuit time threshold is obtained by correcting the initially set lossless short-circuit time threshold on line by using a time at which a second short-circuit current peak of the battery appears; and condition 3: battery temperature is higher than target temperature; and estimating a predicted temperature rise when the external short-circuit occurs on the battery, and if a sum of initial temperature and the predicted temperature rise is higher than the target temperature, ending the heating, and starting a battery system; or if the sum of initial temperature and the predicted temperature rise is lower than the target temperature, conducting external heating by using the external short-circuit of the battery and the external heater together, and after the battery temperature is higher than or equal to the target temperature, ending heating, and starting the battery system.

10. The device according to claim 9, further comprising a Hall sensor H1 and a Hall sensor H2, wherein the Hall sensor H1 is configured to acquire the short-circuit current of the battery, predict heat produced due to a short circuit and a battery temperature rise according to the short-circuit current, and monitor whether the second short-circuit current peak appears; and the Hall sensor H2 is configured to monitor an output current of the battery system.

11. The device according to claim 10, wherein both the main control switch K1 and the external heating control switch K2 are in an off state, and the short-circuit trigger device is controlled to trigger the external short-circuit of the battery.

12. The device according to claim 11, wherein the external heating control switch K2 is switched on, and external self-heating is conducted by using the external heater; and after the heating ends, the main control switch K1 is switched on to start the battery system.

13. The device according to claim 9, wherein the short-circuit trigger device is configured to implement trigger and termination of the external short-circuit of the battery; the short-circuit trigger device is a controllable switch with low contact internal resistance, and the low-temperature heating control unit controls switch-on or switch-off of the short-circuit trigger device through remote control.

14. The device according to claim 13, wherein both the main control switch K1 and the external heating control switch K2 are in an off state, and the short-circuit trigger device is controlled to trigger the external short-circuit of the battery.

15. The device according to claim 14, wherein the external heating control switch K2 is switched on, and external self-heating is conducted by using the external heater; and after the heating ends, the main control switch K1 is switched on to start the battery system.

16. The device according to claim 9, wherein both the main control switch K1 and the external heating control switch K2 are in an off state, and the short-circuit trigger device is controlled to trigger the external short-circuit of the battery.

17. The device according to claim 16, wherein the external heating control switch K2 is switched on, and external self-heating is conducted by using the external heater; and after the heating ends, the main control switch K1 is switched on to start the battery system.

* * * * *